US011799366B2

(12) United States Patent
Nagasugi et al.

(10) Patent No.: US 11,799,366 B2
(45) Date of Patent: Oct. 24, 2023

(54) MANUFACTURING METHOD OF LAMINATED IRON CORE

(71) Applicant: MITSUI HIGH-TEC, INC., Fukuoka (JP)

(72) Inventors: Shigeru Nagasugi, Fukuoka (JP); Takashi Fukumoto, Fukuoka (JP); Jin Oda, Fukuoka (JP)

(73) Assignees: MITSUI HIGH-TEC, INC., Fukuoka (JP); MITSUI HIGH-TEC, INC., Fukuoka (JP)

( * ) Notice: Subject to any disclaimer, the term of this patent is extended or adjusted under 35 U.S.C. 154(b) by 605 days.

(21) Appl. No.: 16/969,787

(22) PCT Filed: Mar. 5, 2019

(86) PCT No.: PCT/JP2019/008660
§ 371 (c)(1),
(2) Date: Aug. 13, 2020

(87) PCT Pub. No.: WO2019/172264
PCT Pub. Date: Sep. 12, 2019

(65) Prior Publication Data
US 2021/0067014 A1   Mar. 4, 2021

(30) Foreign Application Priority Data
Mar. 7, 2018   (JP) .................... 2018-040949

(51) Int. Cl.
*H02K 15/02* (2006.01)
*H02K 1/24* (2006.01)
*H02K 15/03* (2006.01)

(52) U.S. Cl.
CPC .......... *H02K 15/022* (2013.01); *H02K 1/243* (2013.01); *H02K 15/03* (2013.01); *Y10T 29/49009* (2015.01)

(58) Field of Classification Search
CPC .......... H02K 7/04; H02K 15/03; H02K 1/28; H02K 1/243; H02K 15/02; H02K 15/165;
(Continued)

(56) References Cited

U.S. PATENT DOCUMENTS

| 8,393,070 B2 * | 3/2013 | Shirai ................... H02K 15/02 270/58.11 |
| 2009/0026867 A1 * | 1/2009 | Haruno ................ H02K 1/2766 310/156.21 |

(Continued)

FOREIGN PATENT DOCUMENTS

| DE | 10 2012 103 828 | 11/2013 |
| JP | 2000-341889 | 12/2000 |

(Continued)

OTHER PUBLICATIONS

International Search Report issued in International Patent Application No. PCT/JP2019/008660, dated May 14, 2019, and English language translation.

(Continued)

*Primary Examiner* — Thiem D Phan
(74) *Attorney, Agent, or Firm* — GREENBLUM & BERNSTEIN, P.L.C.

(57) ABSTRACT

A manufacturing method of a laminated iron core includes: laminating a plurality of punched members to form a temporary laminate; pressing the temporary laminate with a first load to obtain a laminate; and processing the laminate while pressing the laminate with a second load that is equal to or less than the first load. The manufacturing method of the laminated iron core according to the present disclosure provides a manufacturing method in which subsequent processing can be favorably performed after the laminate is obtained.

5 Claims, 5 Drawing Sheets

(58) Field of Classification Search
CPC ........ H02K 15/16; H02K 1/27; H02K 15/022; Y10T 29/49012; Y10T 29/49009
USPC ....... 29/596, 593, 598, 602.1, 607, 609, 738
See application file for complete search history.

(56) References Cited

U.S. PATENT DOCUMENTS

| | | |
|---|---|---|
| 2010/0154968 A1 | 6/2010 | Shirai et al. |
| 2016/0023447 A1 | 1/2016 | Shimizu |
| 2017/0338724 A1 | 11/2017 | Arakawa et al. |
| 2018/0006509 A1 | 1/2018 | Kato et al. |

FOREIGN PATENT DOCUMENTS

| | | |
|---|---|---|
| JP | 2001-309587 | 11/2001 |
| JP | 2010-143125 A | 7/2010 |
| JP | 2011-218392 | 11/2011 |
| JP | 2016-25317 A | 2/2016 |
| JP | 2016-123242 A | 7/2016 |
| JP | 2017-208955 A | 11/2017 |
| JP | 2018-7421 A | 1/2018 |

OTHER PUBLICATIONS

Written Opinion issued in International Patent Application No. PCT/JP2019/008660, dated May 14, 2019 and English language translation.

\* cited by examiner

MANUFACTURING METHOD OF LAMINATED IRON CORE

TECHNICAL FIELD

The present disclosure relates to a manufacturing method of a laminated iron core.

BACKGROUND ART

A rotor laminated iron core is usually obtained by laminating a plurality of punched members obtained by punching a metal plate (for example, an electromagnetic steel plate) into a predetermined shape. In general, a thickness of the metal plate (for example, the electromagnetic steel plate) is not completely uniform and there are slight differences. Therefore, when the punched members are punched out from the metal plate into the predetermined shape and laminated one by one to obtain the rotor laminated iron core, a variation may occur in a lamination thickness of the rotor laminated iron core (height of the rotor laminated iron core in a lamination direction). In a case where a motor is configured through using rotor laminated iron cores while there is a variation in the lamination thickness of each rotor laminated iron core, torque of the motor varies, which may affect performance of the motor.

Therefore, a manufacturing method of a rotor laminated iron core disclosed in Patent Literature 1 includes: obtaining a temporary laminate by laminating punched members punched out from a metal plate one by one; pressing the temporary laminate to obtain a laminate; and measuring a lamination thickness of the laminate. Gaps between the punched members are reduced by pressing the temporary laminate. Therefore, the lamination thickness of the laminate is stabilized at the time of measuring the lamination thickness. Therefore, since a more accurate lamination thickness is obtained, the variation in the lamination thickness of each rotor laminated iron core is reduced by adjusting (increasing or decreasing) the number of laminated punched members after the measurement of the lamination thickness.

CITATION LIST

Patent Literature

[Patent Literature 1] JP2010-143125A

SUMMARY OF INVENTION

Technical Problem

However, when a load is removed from the temporary laminate, a phenomenon, in which the punched members constituting the laminate tends to expand in the lamination direction (also referred to as "spring back"), may occur. In this case, after a lamination thickness measurement process of measuring the lamination thickness of the laminate, the lamination thickness of the laminate may be changed before the laminate is subjected to further processing. Since the processing is performed based on the lamination thickness measured in the lamination thickness measurement process, quality of the processing may be affected due to the change in the lamination thickness.

Therefore, the present disclosure describes a manufacturing method of a laminated iron core in which subsequent processing can be favorably performed after a laminate is obtained.

Solution to Problem

A manufacturing method of a laminated iron core according to an illustrative aspect of the present disclosure includes: laminating a plurality of punched members to form a temporary laminate; pressing the temporary laminate with a first load to obtain a laminate; and processing the laminate while pressing the laminate with a second load that is equal to or less than the first load.

Advantageous Effects of Invention

According to the manufacturing method of the laminated iron core according to the present disclosure, the subsequent processing can be favorably performed after the laminate is obtained.

DESCRIPTION OF EMBODIMENTS

Figure 1:
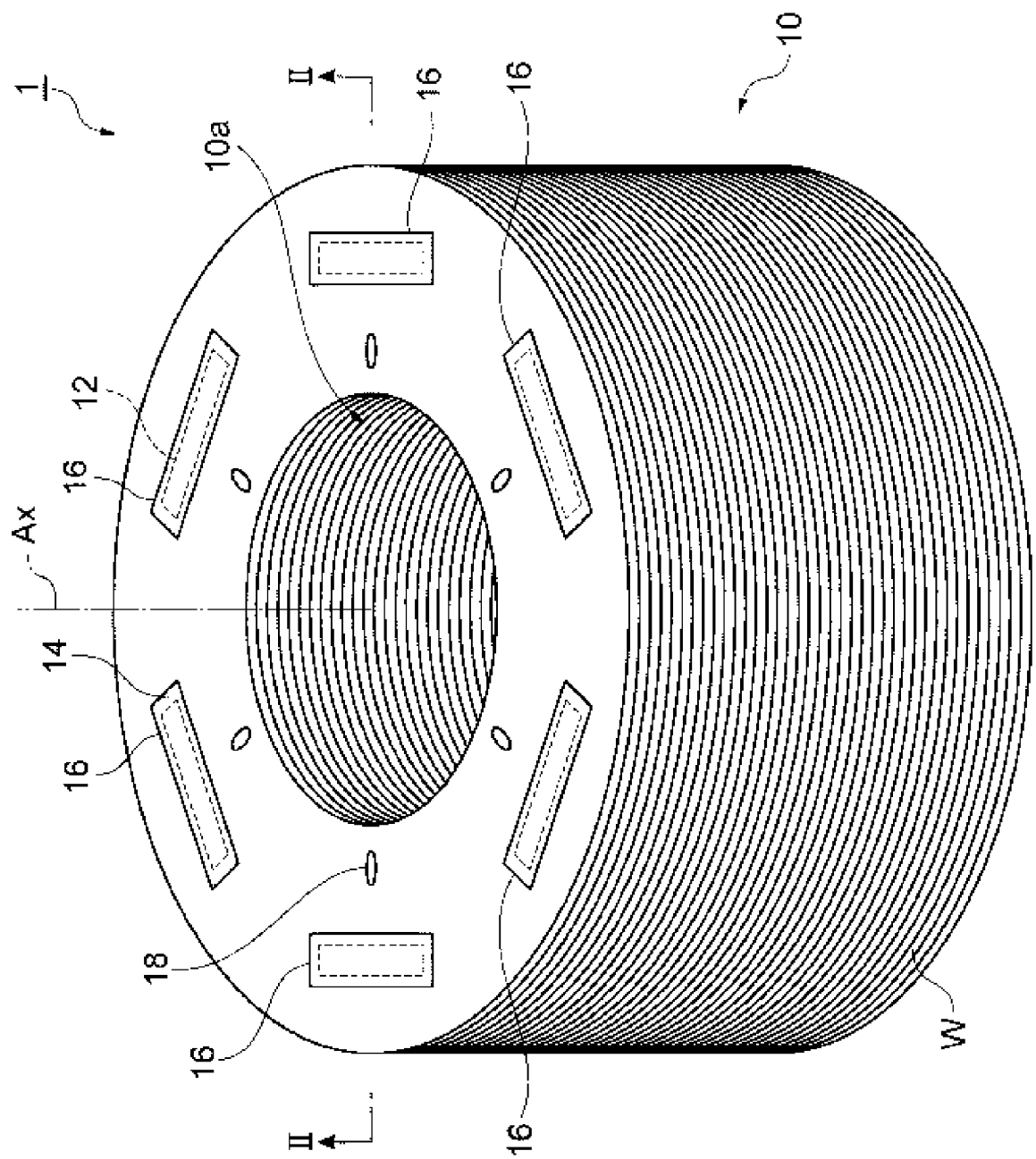
FIG. 1 is a perspective view showing an example of a rotor laminated iron core.

Hereinafter, an example of an embodiment according to the present disclosure will be described in more detail with reference to the drawings. In the following description, the same elements or elements having the same functions will be denoted by the same reference numerals, and repetitive descriptions thereof will be omitted.

[Configuration of Rotor Laminated Iron Core]

First, a configuration of a rotor laminated iron core 1 (laminated iron core) will be described with reference to FIGS. 1 and 2. The rotor laminated iron core 1 is a part of a rotor. The rotor is formed by attaching an end face plate (not shown) and a shaft to the rotor laminated iron core 1. The rotor is combined with a stator to form a motor. The rotor laminated iron core 1 in the present embodiment is used in an interior permanent magnet type (IPM) motor.

As shown in FIG. 1, the rotor laminated iron core 1 includes: a laminate 10; a plurality of permanent magnets 12; and a plurality of solidified resins 14.

As shown in FIG. 1, the laminate 10 has a cylindrical shape. An shaft hole 10a penetrating the laminate 10 is provided in a central portion of the laminate 10 so as to extend along a central axis Ax. That is, the shaft hole 10a extends in a lamination direction of the laminate 10 (hereinafter, simply referred to as the "lamination direction"). The lamination direction is also an extending direction of the central axis Ax. In the present embodiment, since the laminate 10 rotates around the central axis Ax, the central axis Ax is also a rotation axis. The shaft is inserted into the shaft hole 10a.

A plurality of magnet insertion holes 16 are formed in the laminate 10. As shown in FIG. 1, the magnet insertion holes 16 are arranged at predetermined intervals along an outer peripheral edge of the laminate 10. As shown in FIG. 2, the magnet insertion holes 16 penetrate the laminate 10 in a manner of extending along the central axis Ax. That is, the magnet insertion holes 16 extend in the lamination direction.

In the present embodiment, shapes of the magnet insertion holes 16 are long holes extending along the outer peripheral edge of the laminate 10. In the present embodiment, the number of the magnet insertion holes 16 is six. The magnet insertion holes 16 are arranged on the same circumference when viewed from above. The positions, shapes, and number of the magnet insertion holes 16 may be changed according to use, required performance, and the like of the motor.

The laminate 10 is configured by laminating a plurality of punched members W. The punched members W are plate-like bodies formed by punching an electromagnetic steel plate ES described below into predetermined shapes, and have shapes corresponding to the laminate 10. The laminate 10 may be configured by so-called rolling lamination. The term "rolling lamination" refers to relatively staggering angles between the punched members W and laminating a plurality of the punched members W. The rolling lamination is mainly performed to cancel plate thickness deviation of the punched members W. The angles of the rolling lamination may be set to any size.

Figure 2:
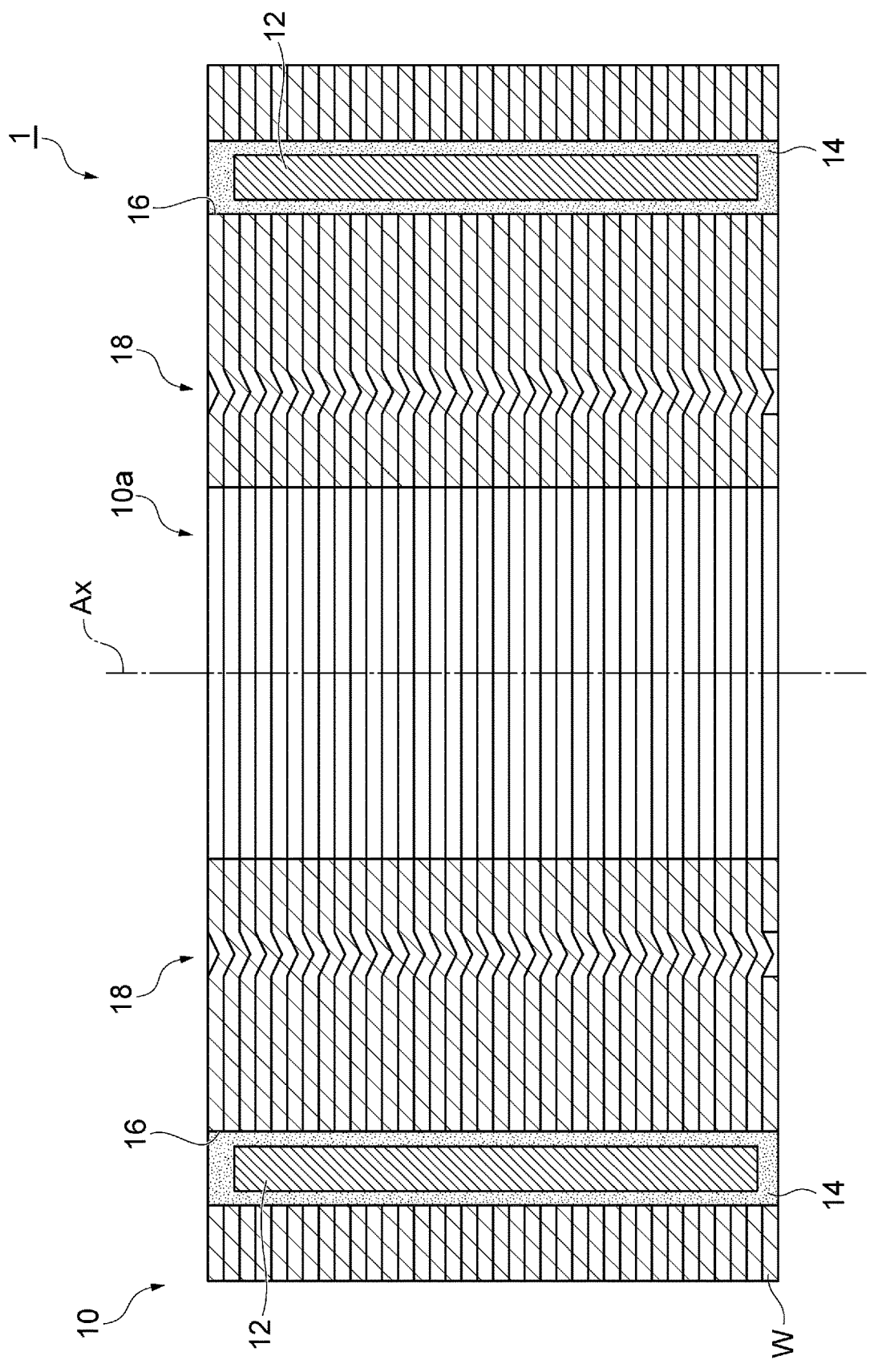
FIG. 2 is a cross-sectional view taken along line II-II of FIG. 1.

As shown in FIGS. 1 and 2, the punched members W adjacent to each other in the lamination direction may be fastened by a caulking portion 18. The punched members W may also be fastened to each other by various known methods instead of the caulking portion 18. For example, the plurality of punched members W may be joined together through using an adhesive or a resin material, or may be joined together by welding. Alternatively, a temporary caulking portion may be provided on each punched member W, and the plurality of punched members W may be fastened to each other via the temporary caulking portion to obtain the laminate 10, and then the temporary caulking portion may be removed from the laminate 10. The term "temporary caulking portion" refers to a caulking portion which is used to temporarily integrate the plurality of punched members W and is removed in a process of manufacturing a product (rotor laminated iron core 1).

As shown in FIGS. 1 and 2, one permanent magnet 12 is inserted into each magnet insertion hole 16. A shape of the permanent magnet 12 is not particularly limited, and the permanent magnet 12 has a rectangular parallelepiped shape in the present embodiment. A type of the permanent magnet 12 may be determined according to the use, the required performance, and the like of the motor, and may be, for example, a sintered magnet or a bonded magnet.

The solidified resin 14 is obtained by solidifying a molten resin material (molten resin) filled in the magnet insertion hole 16. The filling of the molten resin is performed, for example, after the permanent magnet 12 is inserted into the magnet insertion hole 16. The solidified resin 14 has a function of fixing the permanent magnet 12 in the magnet insertion hole 16 and a function of joining the adjacent punched members W in the lamination direction (up-down direction). Examples of the resin material constituting the solidified resin 14 include a thereto setting resin, a thermoplastic resin, or the like. A specific example of the thereto setting resin includes a resin composition including an epoxy resin, a curing initiator, and an additive. Examples of the additive include a filler, a flame retardant, a stress reducing agent, or the like.

[Manufacturing Device of Rotor Laminated Iron Core]

Next, a manufacturing device 100 of the rotor laminated iron core 1 will be described with reference to FIGS. 3 and 4.

The manufacturing device 100 is a device for manufacturing the rotor laminated iron core 1 from an electromagnetic steel plate ES (a plate to be processed) which is a strip-shaped metal plate. The manufacturing device 100 includes an uncoiler 110, a feeding device 120, a punching device 130, a pressing device 200, a lamination thickness measuring device 300, a magnet attachment device 400, and a controller Ctr (control unit).

The uncoiler 110 rotatably holds a coil material 111 in a state where the coil material 111 is mounted. The coil material 111 is obtained by winding the strip-shaped electromagnetic steel plate ES into a coil shape. The feeding device 120 includes a pair of rollers 121, 122 sandwiching the electromagnetic steel plate ES from an upper side and a lower side. The pair of rollers 121, 122 rotate and stop based on an instruction signal from the controller Ctr, and intermittently and sequentially teed the electromagnetic steel plate ES toward the punching device 130.

The punching device 130 operates based on the instruction signal from the controller Ctr. The punching device 130 has a function of sequentially punching the electromagnetic steel plate ES intermittently fed by the feeding device 120 to form the punched members W, and a function of sequentially laminating the punched members W obtained by the punching so as to manufacture the temporary laminate 11. In the present specification, the temporary laminate 11 is in a state where the plurality of punched members W are laminated and fastened to each other by the caulking portion 18 in the same manner as the laminate 10. However, the punched members W are not in close contact with each other, and a certain degree of gap is present between the punched members W.

When the temporary laminate 11 is discharged from the punching device 130, the temporary laminate 11 is placed on a conveyor Cv which extends between the punching device 130 and the pressing device 200. The conveyor Cv operates based on the instruction signal from the controller Ctr, and feeds the temporary laminate 11 to the pressing device 200. It should be noted that the temporary laminate 11 may also be conveyed between the punching device 130 and the pressing device 200 by means other than the conveyor Cv. For example, the temporary laminate 11 may be manually conveyed in a state of being placed in a container.

The pressing device 200 operates based on the instruction signal from the controller Ctr. The pressing device 200 has a function of applying a predetermined load P1 (first load) to the temporary laminate 11 from the lamination direction. The load P1 applied to the temporary laminate 11 may have various sizes depending on a size of the laminate 10, and may be, for example, about 0.1 ton to 50 tons, about 0.5 ton to 30 tons, or about 1 ton to 10 tons. When the load P1 is equal to or greater than 0.1 ton, spring back tends to be less likely to occur. On the other hand, when a load which is greater than necessary is applied to the temporary laminate 11, the formed laminate 10 may be deformed. When the load P1 is equal to or less than 50 tons, such deformation of the laminate 10 tends to be less likely to occur.

The pressing device 200 includes a pair of clamping members 201, 202 and a lifting mechanism 203. The pair of clamping members 201, 202 are flat plates having a rectangular shape. The pair of clamping members 201, 202 are arranged in the up-down direction. A plurality of guide shafts (not shown) extending upward may be provided on an upper surface of the clamping member 201 located on a lower side. Each guide shaft is positioned at each corner portion of the clamping member 201. A through hole (not shown) through which the corresponding guide shaft can be inserted may be provided in each corner portion of the clamping member 202 located on an upper side.

The lifting mechanism 203 is connected to the clamping member 202. The lifting mechanism 203 operates based on the instruction signal from the controller Ctr, and reciprocates the clamping member 202 in the up-down direction. That is, the lifting mechanism 203 is configured such that the clamping members 201, 202 can be brought close to and separated from each other by moving the clamping member 202 up and down along the guide shafts. The lifting mechanism 203 is not particularly limited as long as the clamping member 202 is moved up and down, and may be, for example, an actuator, an air cylinder, or the like.

The lamination thickness measuring device 300 operates based on the instruction signal from the controller Ctr. The lamination thickness measuring device 300 has a function of measuring a lamination thickness of the laminate 10 (height of the laminate 10 in the lamination direction). The lamination thickness measuring device 300 measures the lamination thickness of the laminate 10 in a state where a predetermined load P2 is applied to the laminate 10 from the lamination direction.

The load P2 applied to the laminate 10 is set to be equal to or less than the load P1. The load P2 may have various sizes depending on the size of the laminate 10, and may be set such that, for example, a thickness T of the pressed laminate 10 is equal to 99.9% or more of a thickness T0 of the laminate 10 before pressing and is less than the thickness T0 ($0.999T0 \leq T < T0$).

The lamination thickness measuring device 300 includes a pair of clamping members 301, 302, a lifting mechanism 303, and a distance sensor 304. The pair of clamping members 301, 302 are flat plates having a rectangular shape. The pair of clamping members 301, 302 are arranged in the up-down direction. A plurality of guide shafts (not shown) extending upward may be provided on an upper surface of the clamping member 301 located on a lower side. Each guide shaft is positioned at each corner portion of the clamping member 301. A through hole (not shown) through which the corresponding guide shaft can be inserted may be provided in each corner portion of the clamping member 302 located on an upper side.

The lifting mechanism 303 is connected to the clamping member 302. The lifting mechanism 303 operates based on the instruction signal from the controller Ctr, and reciprocates the clamping member 302 in the up-down direction. That is, the lifting mechanism 303 is configured such that the clamping members 301, 302 can be brought close to and separated from each other by moving the clamping member 302 up and down. The lifting mechanism 303 is not particularly limited as long as the clamping member 302 is moved up and down, and may be, for example, an actuator, an air cylinder, or the like.

Figure 3:
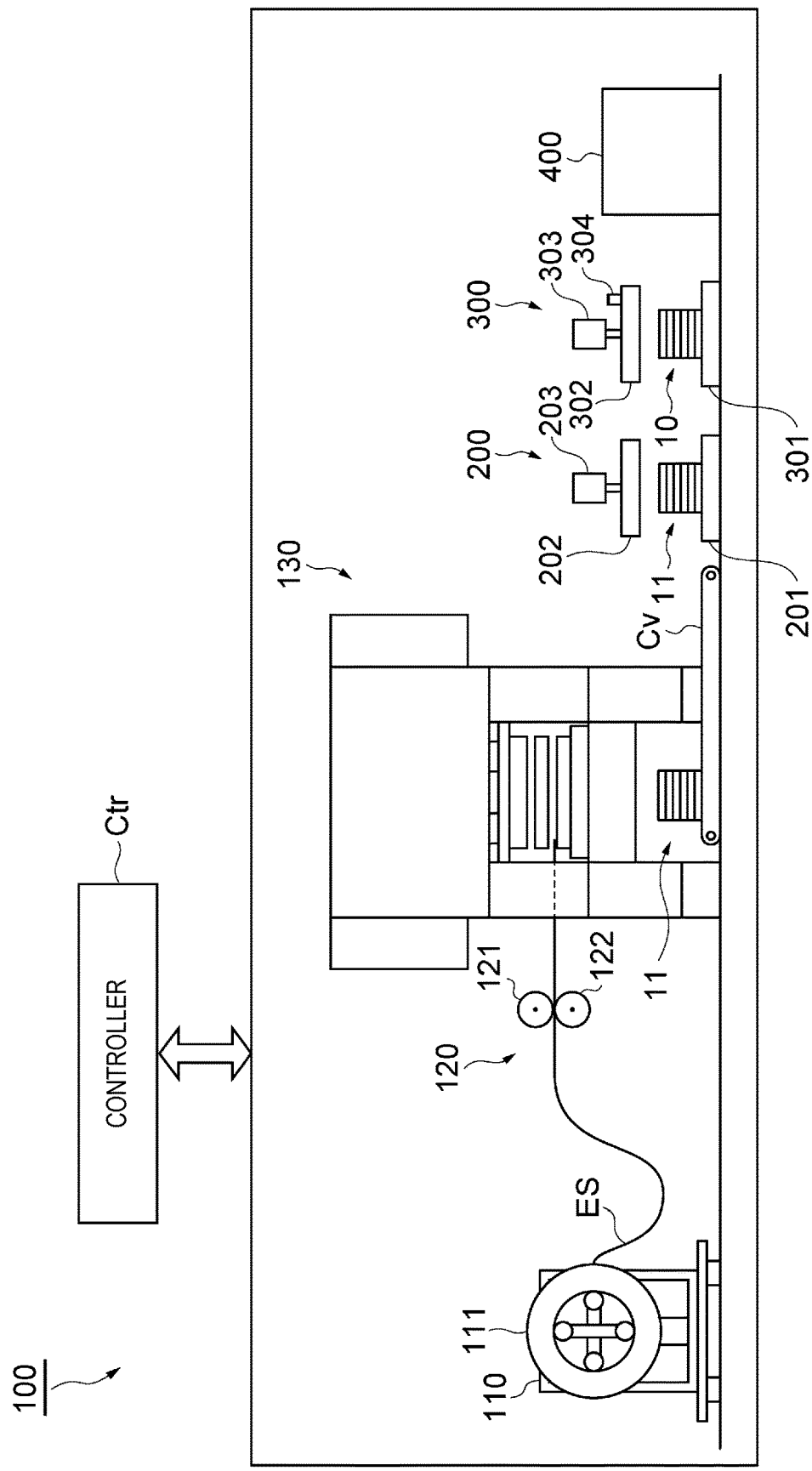
FIG. 3 is a schematic view showing an example of a manufacturing device of the rotor laminated iron core.

The distance sensor 304 is provided on the clamping member 302 as shown in FIG. 3, for example. The distance sensor 304 is configured to measure a distance between the clamping member 301 and the clamping member 302 in a state where the clamping members 301, 302 clamp the laminate 10. That is, the distance sensor 304 indirectly measures the lamination thickness of the laminate 10. Data of the lamination thickness of the laminate 10 measured by the distance sensor 304 is transmitted to the controller Ctr. The laminate 10 whose lamination thickness has been measured may be conveyed by a conveyor between the lamination thickness measuring device 300 and the magnet attachment device 400, or may be manually conveyed in a state of being placed in a container.

The magnet attachment device 400 operates based on the instruction signal from the controller Ctr. The magnet attachment device 400 has a function of inserting the permanent magnet 12 into each magnet insertion hole 16, and a function of filling the molten resin into the magnet insertion hole 16 through which the permanent magnet 12 is inserted. The magnet attachment device 400 includes a lower mold 410, an upper mold 420, and a plurality of plungers 430, as shown in detail in FIG. 4.

The lower mold 410 includes a base member 411 and an insertion post 412 provided on the base member 411. The base member 411 is a plate-shaped member having a rectangular shape. The base member 411 is configured such that the laminate 10 can be placed thereon. The insertion post 412 is located substantially at a central portion of the base member 411, and protrudes upward from an upper surface of the base member 411. The insertion post 412 has a cylindrical shape and has an outer shape corresponding to the shaft hole 10a of the laminate 10.

The upper mold 420 is configured to be capable of clamping the laminate 10 in the lamination direction (height direction of the laminate 10) together with the lower mold 410. When the upper mold 420 and the lower mold 410 clamp the laminate 10 together, a predetermined load P3 (second load) is applied to the laminate 10 from the lamination direction. The load P3 applied to the laminate 10 is set to be equal to or less than the load P1. The load P3 may have various sizes depending on the size of the laminate 10, and may be, for example, about 0.1 ton to 10 tons.

The upper mold 420 includes a base member 421 and a built-in heat source 422. The base member 421 is a plate-shaped member having a rectangular shape. The base member 421 includes one through hole 421a and a plurality of accommodation holes 421b. The through hole 421a is located substantially at a central portion of the base member 421. The through hole 421a has a shape corresponding to the insertion post 412 (substantially circular shape), and the insertion post 412 can be inserted therethrough.

The plurality of accommodation holes 421b penetrate the base member 421 and are arranged at predetermined intervals along a periphery of the through hole 421a. Each accommodation hole 421b is located at a position corresponding to each magnet insertion hole 16 of the laminate 10 when the lower mold 410 and the upper mold 420 clamp the laminate 10. Each accommodation hole 421b has a cylindrical shape and has a function of accommodating at least one resin pellet P therein.

The built-in heat source 422 is, for example, a heater built in the base member 421. When the built-in heat source 422 operates, the base member 421 is heated, the laminate 10 which is in contact with the base member 421 is heated, and the resin pellets P accommodated in the accommodation holes 421b are heated. As a result, the resin pellets P are melted and changed into molten resin.

The plurality of plungers 430 are located above the upper mold 420. Each plunger 430 is configured to be able to be inserted into and removed from the corresponding accommodation hole 421b by a driving source (not shown).

The controller Ctr generates the instruction signal for operating the feeding device 120, the punching device 130, the pressing device 200, the lamination thickness measuring device 300 and the magnet attachment device 400 based on, for example, a program recorded in a recording medium (not shown) or operation input from an operator, and transmits the instruction signal to such devices, respectively.

The controller Ctr has a function of determining whether the data of the lamination thickness measured by the lamination thickness measuring device 300 is within a standard. The laminate 10 whose lamination thickness is within the standard is determined as a non-defective product by the controller Ctr, and is conveyed to the magnet attachment device 400. On the other hand, the laminate 10 whose lamination thickness is outside the standard is determined as a defective product by the controller Ctr, and is excluded from a manufacturing line.

[Manufacturing Method of Rotor Laminated Iron Core]

Next, a method of manufacturing the rotor laminated iron core 1 will be described with reference to FIGS. 3 to 5. First, the electromagnetic steel plate ES is sequentially punched by the punching device 130, the obtained punched members W are laminated to form the temporary laminate 11 (see step S11 in FIG. 5).

Next, the temporary laminate 11 is conveyed to the pressing device 200, and the temporary laminate 11 is placed on the clamping member 201. Next, the controller Ctr instructs the lifting mechanism 203 to lower the clamping member 202. As a result, the temporary laminate 11 is clamped between the clamping members 201, 202, and the temporary laminate 11 is pressed by the load P1. As a result, the gap between the punched members W is reduced, and the laminate 10 is formed (see step S12 in FIG. 5).

Next, the laminate 10 is conveyed to the lamination thickness measuring device 300, and the laminate 10 is placed on the clamping member 301. Next, the controller Ctr instructs the lifting mechanism 303 to lower the clamping member 302. As a result, the laminate 10 is clamped between the clamping members 301, 302, and the laminate 10 is pressed by the load P2. In this state, the controller Ctr instructs the distance sensor 304 to measure the distance between the clamping members 301, 302. The distance sensor 304 transmits the measured data to the controller Ctr as the data of the lamination thickness of the laminate 10. As a result, the lamination thickness of the laminate 10 is measured (see step S13 in FIG. 5). The thickness T0 of the laminate 10 before being pressed by the load P2 can be measured by various known methods, and can be measured through using, for example, a distance sensor using ultrasonic waves or the like, a scale, or the like.

Figure 5:
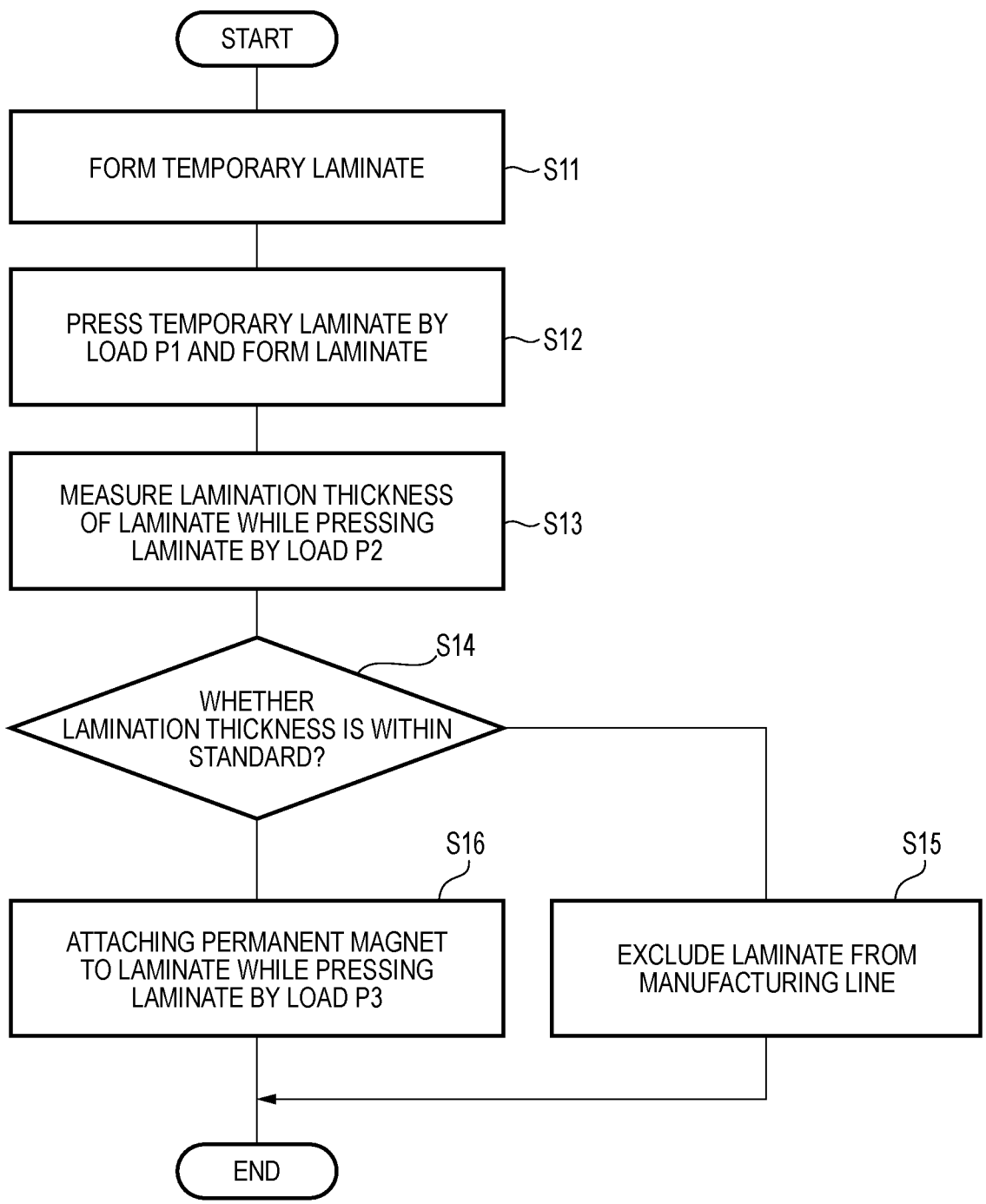
FIG. 5 is a flowchart for showing an example of a manufacturing method of the rotor laminated iron core.

Next, the controller Ctr determines whether the data of the lamination thickness transmitted from the distance sensor 304 is within the predetermined standard (see step S14 of FIG. 5). When the controller Ctr determines that the lamination thickness of the laminate 10 is outside the predetermined standard (NO in step S14 of FIG. 5), the laminate 10 is highly likely to be a defective product, so that the laminate 10 is excluded from the manufacturing line (see step S15 in FIG. 5). When the lamination thickness of the laminate 10 is greater than the predetermined standard, at least one punched member W may be removed from the laminate 10 such that the lamination thickness of the laminate 10 is within the predetermined standard, and the laminate 10 may be returned to the manufacturing line.

Figure 4:
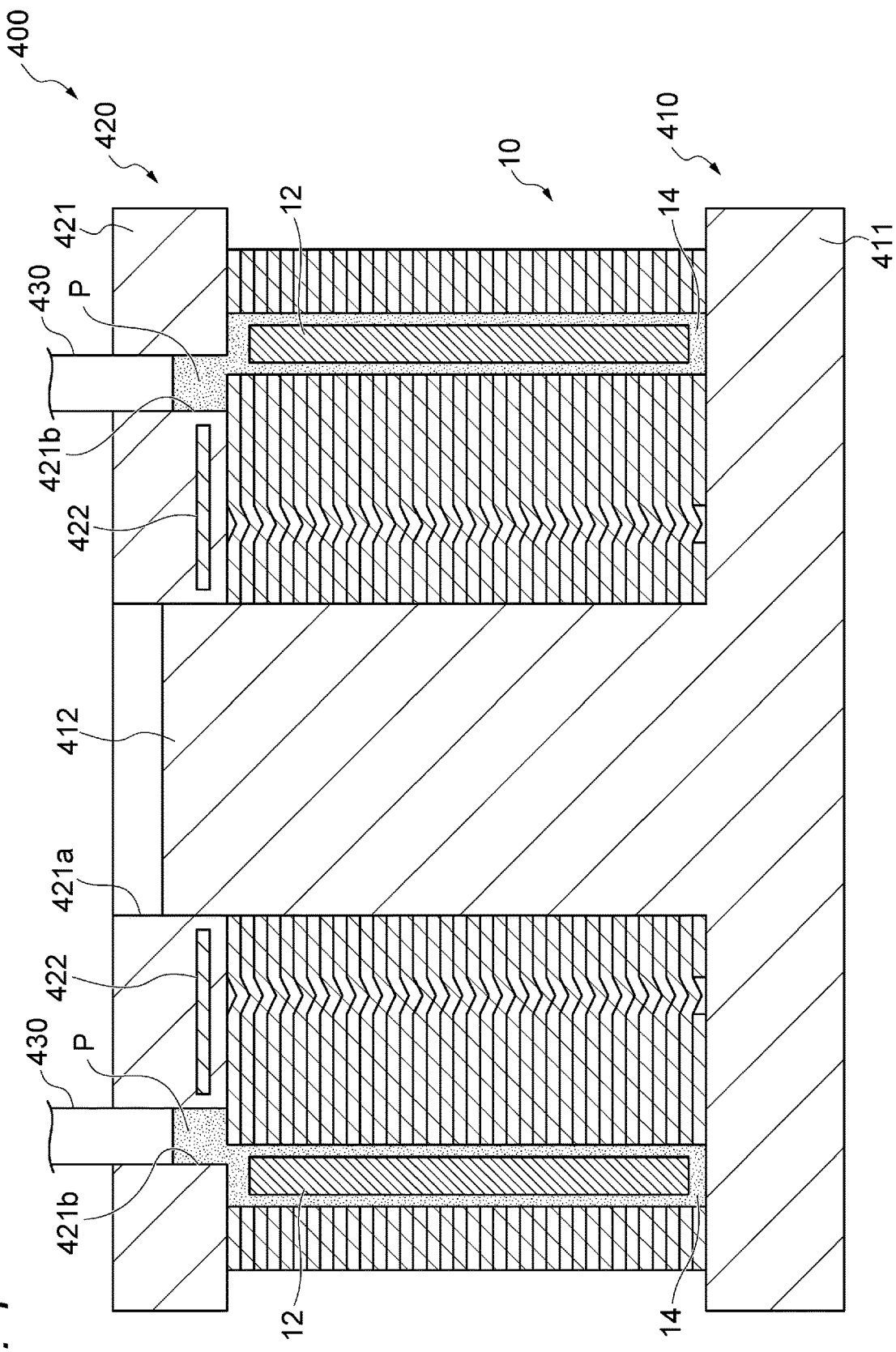
FIG. 4 is a cross-sectional view for showing a state where a permanent magnet is attached to a magnet insertion hole of the rotor laminated iron core by a magnet attachment device.

On the other hand, when the controller Ctr determines that the lamination thickness of the laminate 10 is within the predetermined standard (YES in step S14 of FIG. 5), the laminate 10 is conveyed to the magnet attachment device 400, and the laminate 10 is placed on the lower mold 410 of the magnet attachment device 400 as shown in FIG. 4. Next, the permanent magnet 12 is inserted into each magnet insertion hole 16. The insertion of the permanent magnet 12 into each magnet insertion hole 16 may be performed manually or may be performed by a robot hand (not shown) or the like included in the magnet attachment device 400 based on the instruction signal of the controller Ctr.

Next, the upper mold 420 is placed on the laminate 10. Thereafter, the laminate 10 is clamped from the lamination direction by the lower mold 410 and the upper mold 420, and is pressed by the load P3. Next, the resin pellets P are put into each accommodation hole 421b. When the resin pellets P are melted by the built-in heat source 422 of the upper mold 420, the molten resin is injected into each magnet insertion hole 16 by the plunger 430. At this time, the laminate 10 is heated to, for example, about 150° C. to 180° C. by the built-in heat source 422. Thereafter, when the molten resin is solidified, the solidified resin 14 is formed in the magnet insertion hole 16. Therefore, the permanent magnet 12 is attached to the laminate 10 together with the solidified resin 14 (see step S16 in FIG. 5). When the lower mold 410 and the upper mold 420 are removed from the laminate 10, the rotor laminated iron core 1 is completed.

[Effect]

In the present embodiment as described above, the load P1 by which the temporary laminate 11 is pressed is set to be equal to or greater than the load P3 during molding of the laminate 10 (for example, the injection of the molten resin into the magnet insertion hole 16). Therefore, since the temporary laminate 11 is sufficiently pressed, spring back is prevented during molding of the laminate 10. In other words, by setting the load P1 at the time of pressing the temporary laminate 11 to be equal to or greater than the load P3 at the time of molding the laminate 10, the lamination thickness of the laminate 10 is less likely to change before and after the molding of the laminate 10. Accordingly, the molding process after the pressing process can be favorably performed.

If the temporary laminate 11 is subjected to the molding process while being pressed by the load P3 without being subjected to the pressing process of applying the load P1, the plurality of punched members W are joined together by the solidified resin 14 in a state where the gap between the plurality of punched members W is reduced to some extent. However, since the plurality of punched members W tends to expand in the lamination direction due to the spring back, damage (cracks or the like) may occur in the solidified resin 14. However, in the present embodiment, since the lamination thickness of the laminate 10 hardly changes before and after the processing of the laminate 10, the damage to the solidified resin 14 is less likely to occur.

In the present embodiment, the lamination thickness of the laminate 10 is measured after the temporary laminate 11 is pressed by the load P1 such that the lamination thickness of the laminate 10 is difficult to be changed. Therefore, it is possible to more accurately measure the lamination thickness of the laminate 10. In this case, since the lamination thickness of the laminate 10 is measured before the processing of the laminate 10, whether the lamination thickness of the laminate 10 satisfies the standard can be determined before the processing. Therefore, a defective product can be prevented from being generated after the processing, and thus waste of materials and processing costs can be prevented.

[Modification]

Although the embodiment according to the present disclosure has been described above in detail, various modifications may be made to the above embodiment within the scope of the gist of the invention.

(1) Although the lamination thickness of the laminate 10 is measured after the formation of the laminate 10 and before the molding of the laminate 10 in the above embodiment, the lamination thickness measurement process of the laminate 10 may be performed at any time after the formation of the laminate 10. For example, the lamination thickness of the laminate 10 may be measured after the molding of the laminate 10. For example, after the laminate 10 is formed, the lamination thickness of the laminate 10 is measured (first lamination thickness measurement), then the molding of the laminate 10 is performed, and subsequently the lamination thickness of the laminate 10 may be further measured (second lamination thickness measurement). In these cases, the lamination thickness of the laminate 10 is also measured after the temporary laminate 11 is pressed by the load P1 such that the lamination thickness of the laminate 10 is difficult to be changed, so that the lamination thickness of the laminate 10 can be measured more accurately.

(2) Although the molding process is performed on the laminate 10 in the above embodiment, other processes may also be performed on the laminate 10. For example, a welding process may be performed on a peripheral surface of the laminate 10, or an identification code may be formed on a surface of the laminate 10 (engraving process).

In a case where the welding process is performed on the laminate 10, the plurality of punched members W are joined by welding beads. If the temporary laminate 11 is subjected to the welding process while being pressed by the load P3 without being subjected to the pressing process, the plurality of punched members W are joined together by the welding beads in the state where the gap between the plurality of punched members W is reduced to some extent. However, since the plurality of punched members W tends to expand in the lamination direction due to the spring back, damage (cracks or the like) may occur in the welding beads. However, since the lamination thickness of the laminate 10 of the present disclosure hardly changes before and after the processing of the laminate 10, the damage to the welding beads is less likely to occur.

In the case where the engraving process is performed on the laminate 10, the identification code is formed by irradiating the surface (for example, an upper end surface or a lower end surface) of the laminate 10 with a laser beam. If the temporary laminate 11 is not subjected to the pressing process, since the lamination thickness of the laminate 10 is not stable, a distance between a laser light source and the laminate 10 may vary when the laminate is irradiated with the laser beam to form the identification code on the surface of the laminate 10. Therefore, quality of the identification code may vary. However, since the lamination thickness of the laminate 10 of the present disclosure hardly changes before and after the processing of the laminate 10, the quality of the identification code formed on the surface of the laminate 10 can be favorably maintained. It should be noted that the laminate 10 is preferably pressed by a predetermined load (for example, the load P3) during the engraving process of the laminate 10.

The identification code has a function of holding individual information for identifying an individual of the rotor laminated iron core 1 which is provided with the identification code (for example, product type, manufacturing date and time, materials used therein or manufacturing line). The identification code is not particularly limited as long as the individual information can be held by a combination of bright patterns and dark patterns, and may be, for example, a bar code or a two-dimensional code. The two-dimensional code may be, for example, a QR code (registered trademark), Data Matrix or Vericode. Alternatively, the identification code may also be configured by combining various other colors in addition to white and black as long as contrast thereof can be improved. For example, the identification code may be a layered two-dimensional code (a two-dimensional shape code obtained by multi-layering color information). The layered two-dimensional code may be, for example, a PM code (registered trademark) or the like.

(3) A magnet set in which two or more permanent magnets 12 are combined may be inserted into each magnet insertion hole 16. In this case, in one magnet insertion hole 16, the plurality of permanent magnets 12 may be arranged in a longitudinal direction of the magnet insertion hole 16. In the one magnet insertion hole 16, the plurality of permanent magnets 12 may also be arranged in an extending direction of the magnet insertion hole 16. In the one magnet insertion hole 16, a plurality of permanent magnets 12 may be arranged in the longitudinal direction while a plurality of permanent magnets 12 may be arranged in the extending direction.

(4) In the above embodiment, the resin pellet P accommodated in the accommodation hole 421b of the upper mold 420 is melted by the built-in heat source 422, and the molten resin is injected into the magnet insertion hole 16 into which the permanent magnet 12 is inserted. However, the permanent magnet 12 may also be held in the magnet insertion hole 16 by various other methods. For example, the magnet insertion hole 16 may be filled with resin by heating the laminate 10 in a state where the permanent magnet 12 and the resin pellet P are inserted into the magnet insertion hole 16 and melting the resin pellet P therein. Moreover, for example, the magnet insertion hole may be filled with resin by inserting the heated permanent magnet 12 into the magnet insertion hole 16 in a state where the resin pellet P is inserted into the magnet insertion hole 16 and melting the resin pellet P by heat of the permanent magnet 12.

(5) Although the rotor laminated iron core 1 is described in the above embodiment, the present invention may also be applied to a stator laminated iron core. In this case, the stator laminated iron core may be a split stator laminated iron core in which a plurality of iron core pieces are combined or a non-split stator laminated iron core.

[Summary]

Example 1. The manufacturing method of the laminated iron core (1) according to one example of the present disclosure includes: laminating the plurality of punched members (W) to form the temporary laminate (11); pressing the temporary laminate (11) with the first load (P1) to obtain the laminate (10); and processing the laminate (10) while pressing the laminate (10) with the second load (P3) that is equal to or less than the first load (P1). In this case, the first load (P1) by which the temporary laminate (11) is pressed is equal to or greater than the second load (P3) at the time of processing the laminate (10). Therefore, since the temporary laminate (11) is sufficiently pressed, spring back is prevented during the processing of the laminate (10). In other words, by setting the load (first load P1) at the time of pressing the temporary laminate (11) to be equal to or greater than the load (second load P3) at the time of processing the laminate (10), the lamination thickness of the laminate (10) is less likely to change before and after the processing of the laminate (10). Accordingly, the processing after the pressing process can be favorably performed. Patent Literature 1 does not describe or suggest the load at the time of processing the laminate. Therefore, even if those skilled in the art come into contact with Patent Literature 1, it is not possible for those skilled in the art to come up with a relationship between the load (P1) at the time of pressing the temporary laminate (11) and the load (P3) at the time of processing the laminate (10).

Example 2. In the method of Example 1, the processing of the laminate (10) may include molding the laminate (10), welding the laminate (10), or irradiating the laminate (10)

with a laser beam to form an identification code on the surface of the laminate (10). If the temporary laminate (11) is subjected to the molding process or the welding process while being pressed by the second load (P3) without being subjected to the pressing process, the plurality of punched members (W) are joined together by resin or welding beads in a state where a gap between the plurality of punched members (W) is reduced to some extent. However, since the plurality of punched members (W) tends to expand in the lamination direction due to the spring back, damage (cracks or the like) may occur in the resin or welding beads. However, according to Example 2, since the lamination thickness of the laminate (10) hardly changes before and after the processing of the laminate (10), the damage to the resin or welding beads is less likely to occur. On the other hand, if the temporary laminate (11) is not subjected to the pressing process, since the lamination thickness of the laminate (10) is not stable, a distance between a laser light source and the laminate (10) may vary when the laminate (10) is irradiated with the laser beam to form the identification code on the surface of the laminate (10). Therefore, quality of the identification code may vary. However, according to Example 2, since the lamination thickness of the laminate (10) hardly changes before and after the processing of the laminate (10), the quality of the identification code formed on the surface of the laminate (10) can be favorably maintained.

Example 3. The method of Example 1 or 2 may further includes: measuring the lamination thickness of the laminate (10) after the laminate (10) is obtained. In this case, the lamination thickness of the laminate (10) is measured after the temporary laminate (11) is pressed by the first load (P1) such that the lamination thickness of the laminate (10) is difficult to be changed. Therefore, it is possible to more accurately measure the lamination thickness of the laminate (10).

Example 4. The method of Example 1 or 2 may further includes: measuring the lamination thickness of the laminate (10) after the laminate (10) is obtained and before the laminate (10) is processed. In this case, the lamination thickness of the laminate (10) is measured after the temporary laminate (11) is pressed by the first load (P1) such that the lamination thickness of the laminate (10) is difficult to be changed. Therefore, it is possible to more accurately measure the lamination thickness of the laminate (10). In this case, since the lamination thickness of the laminate (10) is measured before the processing of the laminate (10), whether the lamination thickness of the laminate (10) satisfies a standard can be determined before the processing. Therefore, a defective product can be prevented from being generated after the processing, and thus waste of materials and processing costs can be prevented.

Example 5. In the method of any one of Examples 1 to 4, the first load (P1) may be equal to or greater than 0.1 ton. When the first load (P1) is equal to or greater than 0.1 ton, spring back tends to be less likely to occur.

Example 6. In the method of any one of Examples 1 to 5, the first load (P1) may be equal to or less than 50 tons. When a load which is greater than necessary is applied to the temporary laminate (11), the laminate (10) may be deformed. When the first load (P1) is equal to or less than 50 tons, such deformation of the laminate (10) tends to be less likely to occur.

This application is based on JP2018-040949A filed on Mar. 7, 2018, the contents of which are incorporated herein by reference.

INDUSTRIAL APPLICABILITY

According to the manufacturing method of the laminated iron core according to the present disclosure, the subsequent processing can be favorably performed after the laminate is obtained.

REFERENCE SIGNS LIST

1 . . . rotor laminated iron core (laminated iron core), 10 . . . laminate, 11 . . . temporary laminate, 100 . . . manufacturing device of rotor laminated iron core, 130 . . . punching device, 200 . . . pressing device, 300 . . . lamination thickness measuring device, 400 . . . magnet attachment device, P1 . . . load (first load), P3 . . . load (second load), NV . . . punched member.

The invention claimed is:

1. A manufacturing method of a laminated iron core, comprising:
   laminating a plurality of punched members to form a temporary laminate;
   pressing the temporary laminate with a first load to obtain a laminate; and
   processing the laminate while pressing the laminate with a second load that is equal to or less than the first load, wherein the processing the laminate while pressing the laminate with the second load includes:
   molding the laminate;
   welding the laminate; or
   irradiating the laminate with a laser beam to form an identification code on a surface of the laminate.

2. The manufacturing method according to claim 1, further comprising:
   measuring a lamination thickness of the laminate after the laminate is obtained.

3. The manufacturing method according to claim 1, further comprising:
   measuring a lamination thickness of the laminate after the laminate is obtained and before the laminate is processed.

4. The manufacturing method according to claim 1, wherein the first load is equal to or greater than 0.1 ton.

5. The manufacturing method according to claim 1, wherein the first load is equal to or less than 50 tons.

* * * * *